United States Patent [19]
Künzel et al.

[11] Patent Number: 5,730,916
[45] Date of Patent: Mar. 24, 1998

[54] PROCESS FOR MANUFACTURING ESSENTIALLY CARBON FILLER OR DISTRIBUTING BODY FOR FLOWING LIQUIDS

[75] Inventors: Jürgen Künzel, Thierhaupten; Manfred Nedoschill, Meitingen; Manfred Schmid, Augsburg, all of Germany

[73] Assignee: SGL Technik GmbH, Germany

[21] Appl. No.: 455,317

[22] Filed: May 31, 1995

[30] Foreign Application Priority Data

Jun. 1, 1994 [DE] Germany .......... 44 19 114.6

[51] Int. Cl.$^6$ .......... C01B 31/02; C01B 31/04
[52] U.S. Cl. .......... 264/29.4; 261/94; 264/29.1; 264/29.6; 264/29.7; 423/445 R; 423/448; 428/408
[58] Field of Search .......... 264/29.4, 29.1, 264/29.6, 29.7; 423/445 R, 448; 428/408; 261/94

[56] References Cited

U.S. PATENT DOCUMENTS

| | | | |
|---|---|---|---|
| 3,635,676 | 1/1972 | Sands | 264/29.1 X |
| 3,832,426 | 8/1974 | Malthouse et al. | 264/29.4 |
| 4,466,932 | 8/1984 | Koyama et al. | 264/29.4 X |
| 5,094,780 | 3/1992 | von Bonin | 423/448 X |
| 5,215,690 | 6/1993 | Golino et al. | 264/29.6 |
| 5,247,005 | 9/1993 | von Bonin et al. | 423/448 X |
| 5,288,429 | 2/1994 | von Bonin et al. | 423/448 X |
| 5,356,852 | 10/1994 | DeLiso et al. | 428/408 X |

FOREIGN PATENT DOCUMENTS

| | | |
|---|---|---|
| 2411684 | 9/1974 | Germany. |
| 4108031 | 9/1992 | Germany. |

OTHER PUBLICATIONS

Patent Abstracts of Japan, vol. 12, No. 433 (C-543) Nov. 15, 1988 & JP-A-63 159 213 (Tadashi Izumi) Jul. 2, 1988.
Database WPI, Section Ch, week 9237, Derwent Publications Ltd., London, GB; Class E31, AN 92-305832.
Winnacker-Küchler, *Chemische Technologie*, vol. 1, Carl Hanser Verlag, Munich, 1970, pp. 504, 505 & Transla.
Ullmann's Encyclopedia of Industrial Chemistry, 5th Ed., vol. B3, pp. 4-84.

*Primary Examiner*—Adrienne C. Johnstone
*Attorney, Agent, or Firm*—Connolly & Hutz

[57] ABSTRACT

Process for manufacturing filler and distributing bodies essentially or carbon for process technology, in which ground cereal products are used as dry raw material and preferably water or aqueous synthetic resin preparations are used as binders. Dry material, preferably semolina, is mixed with the binder, the mixed composition is molded into primary product bodies and these are then hardened and subsequently coked or coked and graphitized. A typical use of the process involves the manufacture of small filler bodies of complicated shape.

19 Claims, 3 Drawing Sheets

PROCESS FOR MANUFACTURING ESSENTIALLY CARBON FILLER OR DISTRIBUTING BODY FOR FLOWING LIQUIDS

FIELD OF THE INVENTION

The invention relates to a process for manufacturing carbon filler and distributing bodies for flowing fluids, carbon filler and distributing bodies for flowing fluids and the use of such filler and distributing bodies.

DESCRIPTION OF THE PRIOR ART

In process technology, filler and distributing bodies are used continuously to re-deflect, distribute or convey in specified fashion fluids which are moved relative to them, come into contact with them and which can also be conveyed in countercurrent. In such cases they preferably act as auxiliaries for substance and energy exchange processes between fluid substances or substance systems which are moved past each other under identical or different physical conditions. Substance concentratings and/or depletions, chemical conversions, purifications or the cooling or heating of fluids can take place, for example, in these processes. Processes which merit special mention here are distillation and/or rectification, extraction, evaporative cooling as well as the separation of substances from gases. The apparatus and installations in which these processes are carried out contain in the exchange and/or reaction zone built-in components which continuously create new surface and substance contacts by continuously diverting and re-distributing the fluids taking part in the process. The simplest and very frequently used type of built-in components are so-called filler bodies which can assume in the apparatus an extensively random arrangement, such as one brought about by pouring in or flushing in, or an orderly arrangement. Generally speaking filler bodies should have as large a surface as possible, be equal to the mechanical stresses which occur on handling and in operation by means of an adequate compressive strength and abrasion resistance with respect to the media to which they are exposed, be chemically stable and also have as low a weight as possible in order to keep the column formed from them within limits and be inexpensive. The filler bodies which are most frequently used comprise glass, ceramic, metal or plastics material. Their shape often corresponds to a cylindrical casing with or without openings, it also being possible for these shapes to have built-in components (Raschig rings, Infos rings, Pall rings, Bialecki rings) (Ullmann's Encyclopedia of Industrial Chemistry, fifth Ed., VCH Publishers, Vol. B3, page 4–84). Other filler bodies are saddle-shaped (Berl saddle, Novalox saddle, Intalox saddle) (see the above literature reference), have surfaces shaped like a worm conveyor or have spiral shapes or shapes derived from other geometrical bodies. When the set task is to use filler bodies or other built-in components under highly corrosive conditions or at high temperatures the person skilled in the art often has difficulty in selecting a suitable material. Even when expensive special alloys are used, metal filler bodies often have only limited resistance, plastics filler bodies lack temperature stability and chemical resistance, with respect to organic or saponifying media, for example, and the ceramic filler bodies are attacked by alkalis, certain mineral acids and agents containing fluorine and they have poor thermal conductivity. A further disadvantage of metal and ceramic filler bodies is their high weight.

Many of the corrosion and weight problems could be solved by using carbon filler bodies, the term carbon equally including non-graphitized carbon and graphite. Carbon is resistant to virtually all acids, alkalis and organic agents. It is only attacked by the strongest oxidizing agents. Uses of carbon in process technology have also been known for a long time (e.g. Winnacker and L. Küchler, Chemische Technologie, Band 1, Anorganische Technologie I (Chemical Technology, Vol. 1, Inorganic Technology I), p. 504, Carl Hanser Publishers, Munich, 1970). Similarly, carbon filler bodies in the form of Raschig or Pall rings are known. The disadvantage of these carbon components is their high price, which approaches that of special alloys. A further disadvantage of the carbon filler bodies known to date is linked to their manufacture in that their walls are comparatively thick and it is impossible to manufacture more complicated shapes in smaller sizes and thinner material thicknesses cheaply.

SUMMARY OF THE INVENTION

The technical problem that is the object of the invention has therefore been to create a process with the aid of which it is possible to manufacture low-cost carbon filler and distributing bodies which are also complicated in shape and which have thin walls compared to already known carbon filler bodies.

In the context of this document the term carbon always means both carbonized, non-graphitic carbon as well as graphite unless otherwise expressly stated in an individual case.

The technical problem is solved by the process of this invention, in which filler or distributing bodies essentially of carbon for flowing fluids are manufactured by the steps comprising:

a) grinding the cereal (to obtain, e.g., semolina, especially hard or soft wheat semolina), b) mixing the ground product or a portion of the ground product with a binder (e.g. water, preferably in the amount of 10 to 55% by weight of dry material including the ground product used and any fillers which may be added) until a plastic, moldable composition is produced, c) forming (e.g. extruding and then dividing into pieces or molding with the aid of molding rolls) the plastic composition into primary product bodies which have the shape of the subsequently-fromed filler or distributing bodies, apart from the geometrical dimensions (i.e. immature or "green" bodies or pre-forms which change dimension upon further processing), d) hardening the primary product bodies (e.g. drying to a residual water content of 5 to 20% by weight), and e) coking the hardened bodies in the absence of media having an oxidizing effect, this step being preferably conducted at a temperature of at least 600° C., e.g. from at least 1,000 to no more than 3,000° C.

In the mixing step the optional fillers are fillers whose ash residue after the coking step is no more than 15% by weight of the filler, preferably in a quantity up to 60% by weight of the ground product produced from cereal that is used. Processing auxiliaries such as molding or flow auxiliaries, wetting aids, emulsifiers, or stabilizers are also optionally added during the mixing step.

An important feature of the invention is that essentially renewable raw materials, viz. cereals of all species and preferably water as binder are used for the manufacture of the filler and distributing bodies—called simply filler bodies below. Examples of cereal varieties which can be used according to the invention are wheat, rye, barley, maize, rice, oats, millet, spelt, buckwheat etc. The preferred starting material is wheat. The cereal is ground according to customary methods and the ground material is mixed with a binder until a coherent, plastic composition is obtained. The ground cereal can be used as it is, i.e. without further separation into fractions, or fractions of the ground material can be used. Preferably the fractions containing starch, such as flour or semolina, are used. The use of hard wheat semolina and soft wheat semolina is particularly preferred. After mixing with the binder, hard wheat semolina produces compositions which are not so workable but are stiffer, whereas soft wheat semolina produces compositions with better flowability. Soft wheat semolina is therefore preferred for the manufacture of more complicated components.

DETAILED DESCRIPTION

Figure 1:
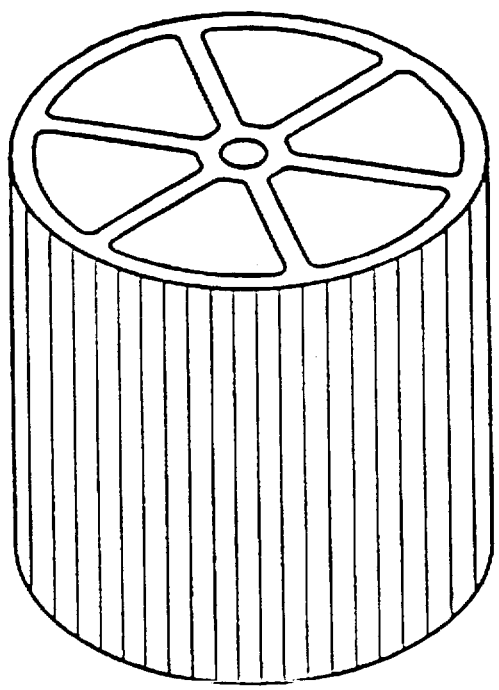
FIG. 1 is a perspective view of a shaped primary product body made according to the process of this invention.

All substances with binding power can be used as binders, with which substances components molded from a mixed material can be manufactured according to the process described here, which components can no longer be softened following a hardening or drying process under the effect of temperature and no longer exude cokable substances in liquid form in the carbonization or coking step following the hardening or drying process. The consequence of this, and an advantageous feature of the invention, is that the molded bodies can be coked without a packing powder protecting and surrounding them. Not only does all the outlay associated with the work with packing powder cease to apply, but also the cleaning of the filler bodies after coking, which is very complicated according to the prior art when working with pitch-bound compounds. In conjunction with the use of inexpensive cereal raw materials the procedure described above signifies a substantial simplification and a considerable reduction of the outlay. According to the above, softenable pitches are unsuitable as binders. All hardenable resins such as phenolformaldehyde or furan resins and/or their preparations can be used, for example. The preferred binder is, however, water, which is undoubtedly the cheapest and moreover the most widely available and most environmentally friendly binder. The quantity of water added to the dry material is preferably 10 to 55 per cent by weight.

The mixing of ground product, and any fillers which may be added, with the particular binder or binder system used takes place in generally known positive mixers such as Z-arm kneaders, double screw mixers or high-speed mixers (Eirich, Lödige). Mixing takes place until a plastic, moldable composition is produced. According to the preferred procedures the mixers are operated without additional heating. If the circumstances so require, the mixed material can also be tempered.

After mixing, the mixed material is processed into molded bodies which already have the shape, but not the dimensions, of the finished filler bodies. As the molded bodies shrink to an extent of the order of 35 to 75 per cent by volume in the subsequent conversion into carbon, coking or carbonization, they need to receive correspondingly larger dimensions when being molded. Moulding can be undertaken by extruding, calendaring or stamping using all machines and apparatus suitable for this, such as extruders, screw-type extruders, dies presses, stamping machines or moulding rolls. The shapes that can be manufactured range from simple cylindrical rings, rings with spurs extending into the interior of the ring from the ring wall (Pall rings), rings with built-in components like a channel, similar to a spoked wheel or a grid, through saddle shapes to spirals or even regular shapes which can be put together to provide an ordered packing. Shapes of the type quoted are known in principle and can be found in the relevant literature (e.g. Ullmarm's Encyclopedia of Industrial Chemistry, fifth Ed., VCH Publishers, Vol. 3, page 4–84) or company literature (e.g. that produced by Vereinigte Füllkörperfabriken, 56230 Ransbach-Baumbach). It should be emphasized that very thin-walled molded bodies with wall thicknesses of approx. 1 mm can also be manufactured according to this process.

The bodies are hardened after moulding. In this process step either the water content of the molded bodies is reduced to such an extent that they can no longer be deformed without breaking or another binder system which may be present, such as one containing resin, is hardened. Hardening can take place at room temperature in most cases. To accelerate the process, however, work is suitably carried out with a hot-air hardening or drying, the temperatures and temperature gradients used needing to be adapted to the material to be hardened. The person skilled in the art will have no difficulty in determining these conditions by means of simple preliminary trials. With molded bodies based on hard wheat semolina with a water content of 30 to 35 per cent by weight, for example, the drying time is between 12 and 18 hours, drying initially taking place for six to 10 hours with air at 45° to 50° C., followed by four hours, drying with air at 50° to 60° C. and four hours at 60°to 70° C., until a body that is of stable form and suitable for coking is produced. When water is used as binder the residual water content of such a body after hardening is five to 20 per cent by weight, correspondingly lower when binders containing resin are used.

The molded bodies are coked after hardening. This process step must take place with the exclusion of media which have an oxidizing effect, such as oxygen, carbon dioxide or water. As the molded bodies no longer soften when heated, the coking can take place without supporting packing material. Reference has already been made above to the advantages of this procedure. Coking must, however, take place under a protective gas atmosphere in order to prevent oxidations. In this process step degassing and combined decomposition and degassing processes take place which cause a weight loss of up to 75% depending on the material to be coked. Furthermore, the molded bodies shrink by up to 75% by volume. This reduces their wall thickness correspondingly further, so that filler bodies of complicated design with wall thicknesses down to 0.5 mm can be manufactured, for example. As considerable mechanical stresses also accompany these degassing and shrinking processes the rate of temperature rise in the course of this process step may not be too high. This is why gradients exceeding 100 K/hr should not be used, particularly in the range from 250° to 400° C. Higher gradients can be employed before and after this critical range. Lower gradients are preferably used, however, which are in the range from 10 to 30 K/hr or below and can be used over the entire temperature range from room temperature up to the final temperature. In the initial phase, which extends to approx.

400° C. product temperature, it is also advantageous to work with a low gradient of up to 15 K/hr and then to increase the rate of temperature rise gradually to 100 to 150 K/hr in the end phase. The minimum temperature that must be achieved when coking is 600° C. Coking is preferably carried out up to temperatures of 800° to 1000° C. This produces filler bodies of coke-like carbon which have high mechanical strength and abrasion resistance as well as comparatively low thermal and electrical conductivity. It is, however, also possible to increase the temperature to up to 3000° C. in the context of the coking step or in a step which follows it. In this case graphitized filler bodies are obtained which have better thermal and electrical conductivity but only slightly reduced mechanical strength and abrasion resistance compared with bodies of this kind treated only at 1000° C. The reason for the only slight decrease in strength and abrasion resistance is the poor graphitizability of the carbon present here, which is very similar to the so-called vitreous carbon with a three-dimensionally crosslinked structure of the C atoms. When using the preferred variant of this process, viz. the manufacture of filler bodies solely from semolina and water, for example, it is of advantage that the only by-products which occur on coking are gases which can easily be controlled and are largely uncritical, gases such as water, oxides of carbon and low-molecular alkanes such as methane and ethane. Condensed hydrocarbons with carcinogenic potential which always occur when pitch-bound filler body blanks are coked, have not been observed here.

Further fillers can be added to the dry material obtained from cereals or to the mixture of this dry material and a binder. The only substances that can be considered as fillers for this purpose are those which have an ash content not exceeding 15% by weight of the filler after coking. Their carbon content can vary within wide limits. Examples of preferred fillers of this kind are coke or graphite powder, carbon black, wood dust, peat dust, cellulose powder or coal dust. The processability of the products as they pass through the individual manufacturing steps can be improved and the development of the properties of the filler bodies can be influenced by adding these substances. The person skilled in the art in the field of carbon technology will be able to estimate the effect of adding the various fillers. For example, the amount of shrinkage of the molded bodies on coking is reduced by a corresponding addition of carbon powder, without the strength of the finished product changing substantially. An addition of wood dust, peat dust or cellulose powder increases the number of open pores in the filler bodies, whilst an addition of coal dust from a coking coal increases the open porosity and the strength of the end product.

Processing auxiliaries can be added to the components that are to be mixed, before or in the course of mixing, to improve the processability. The purpose of such agents is, for example, to control the wettability of the components to be mixed, to improve the flow behavior of the composition on moulding, to increase the stability of the composition after moulding etc. These are agents with which the person skilled in the art will be familiar from related branches of industry such as the ceramic industry and the carbon technology associated with it. Examples are synthetic or natural oils or fatty acid salts such as stearates as moulding or flow auxiliaries, sulphonates such as alkyl-benzenesulphonates, fatty alcohol sulphates, amine and ammonium compounds with alkyl or alkylaryl groups, fatty alcohol derivatives or polyglycols as wetting aids or emulsifiers and cellulose derivatives such as hydroxy-propylcellulose as thickeners and stabilizers. These agents are added in small quantities only.

The filler bodies according to the invention are used in installations for material and/or heat exchange, such as in distillation, rectification, extraction, heating or cooling plants or in installations for separating liquids from gases or for mixing or conveying fluids.

The advantages of the invention are as follows:

It creates a possibility for the low-cost manufacture of carbon filler bodies by using inexpensive starting materials and by saving on working with packing powder in the coking step and the cleaning after coking.

It creates an inexpensive possibility for manufacturing complicated filler body shapes with sufficient strength with wall thicknesses down to 0.5 mm. It creates an environmentally friendly process for the manufacture of carbon filler bodies by using renewable raw materials and essentially water as binder, these recipe constituents giving off substances which are either harmless or easy to dispose of, on thermal decomposition.

The invention is explained below with the aid of an exemplifying embodiment, although it is not restricted to this example.

EXAMPLE

Commercial hard wheat semolina with a product-based water content of 14.5–15% by weight and a granular composition of

| >650 | μm | 0.4% by weight |
| >400 to 650 | μm | 33.4% by weight |
| >112 to 400 | μm | 54.0% by weight |
| <112 | μm | 12.2% by weight | was mixed in a twin-shaft screw-type extruder equipped with delivery and accumulation zones with the addition of 15% by weight of tap water of drinking water quality, related to the amount of semolina used, and extruded through a correspondingly shaped die. Mixing and extrusion took place with no additional heating. The moulding area of the die had a cylindrical shape with six circular segments arranged at a distance from each other and from the cylinder wall and a concentric mandrel, so that a hollow-cylindrical strand with six vane-like built-in components which were connected to a concentric hollow shaft could be extruded. A short distance beyond the die this strand was divided into sections of molded body blanks of corresponding length and/or height. A molded body of this kind is shown diagrammatically in FIG. 1. The external diameter of this moulding was approx. 23 mm, it was approx. 23 mm high and the wall thickness of the cylindrical casing and the vanes approx. 2 mm. The concentric mandrel had an external diameter of approx. 6.5 mm and an internal diameter of approx. 3.5 mm. The extruded molded bodies were dried and hardened to a residual water content of 12.7% by weight in a circulating air drying cabinet in three stages according to the following temperature/time program.

Stage 1:8 hours at 45°–50° C. (final temperature 50° C.)
Stage 2:4 hours at 50°–60° C. (final temperature 60° C.)
Stage 3:4 hours at 60°–70° C. (final temperature 70° C.)

After the hardening/drying the bodies were of stable shape and could be handled without difficulty. The hardened molded bodies were then coked in a protective atmosphere furnace with nitrogen as the protective gas, without using carbon packing powder surrounding the molded bodies, according to the following time/temperature program:
Heating linearly in 133 hours from room temperature to 400° C. (temperature gradient 3 K/hr)

linearly in 40 hours from 400° C. to 600° C. (temperature gradient 5 K/hr)

linearly in 20 hours from 600° C. to 900° C. (temperature gradient 15 K/hr).

The molded bodies obtained after cooling under protective gas had undergone a weight loss of 75% and had shrunk to the dimensions:external diameter 15 mm, height 15 mm, wall thicknesses 1 to 1.5 mm. Parameters of the following mean values were measured on the filler bodies:

Bulk density (DIN 51918) 1.29 g/cm$^3$

Density (DIN 51901) 1.75 g/cm$^3$

Pore volume (open) (DIN 51918) 20%

Compressive strength, measured on the entire body (DIN51910):
   axial: 40N
   radial: 450N The following values were obtained for a free packing of the filler bodies such as is produced when they are placed into a distillation column Bulk density: 240 kg/m$^3$ Volume-related surface of the packing: 445 m$^2$/m$^3$ Free volume of the packing: 68%

Figure 2:
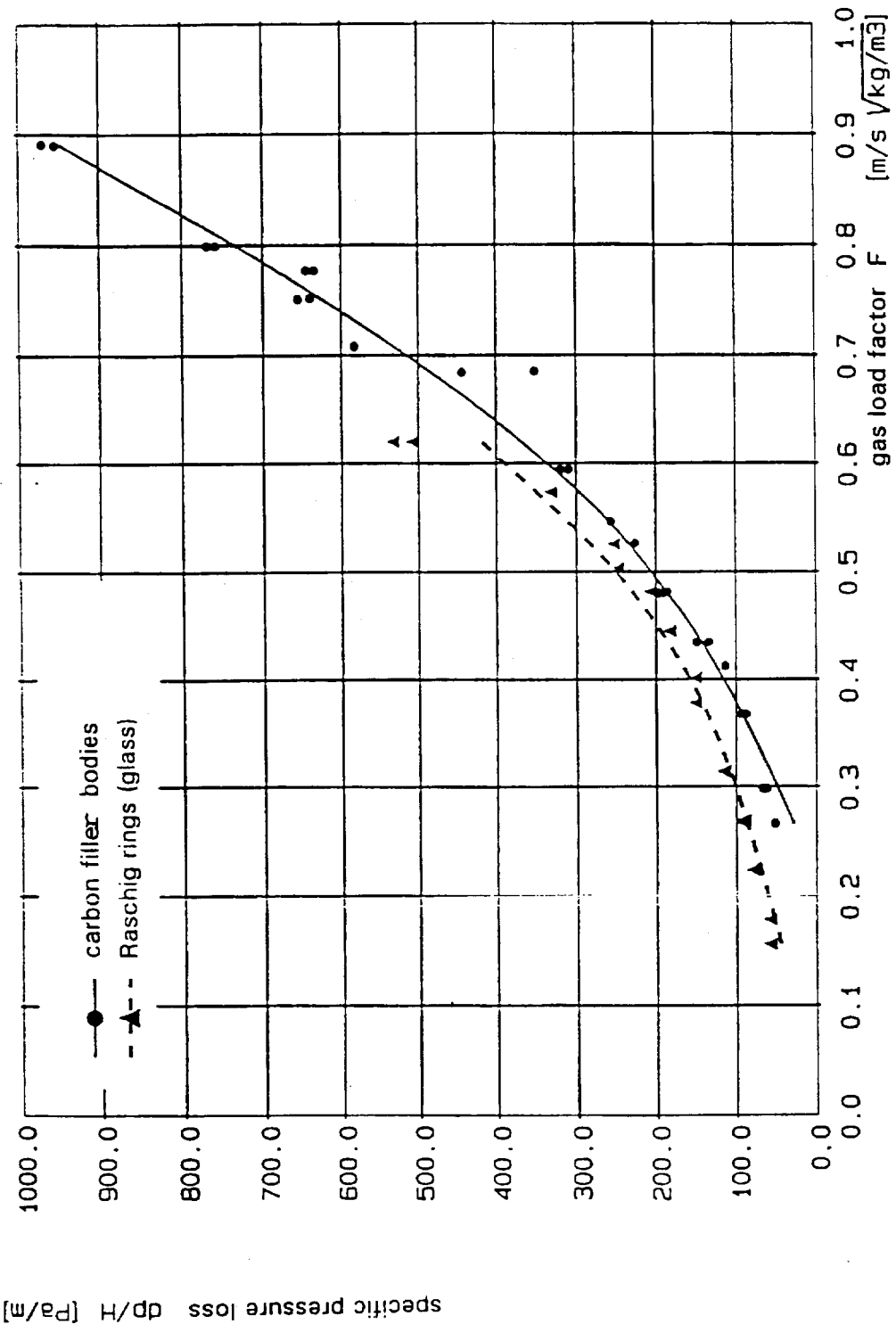
FIG. 2 ("1") is a graphical plot of the results of a comparative study of the performance (in terms of specific pressure loss per meter of column height), in a distillative separation of a cyclohexane/n-heptane system, of a distillation column packed with filler bodies made according to this invention versuls glass Raschig rings.
Figure 3:
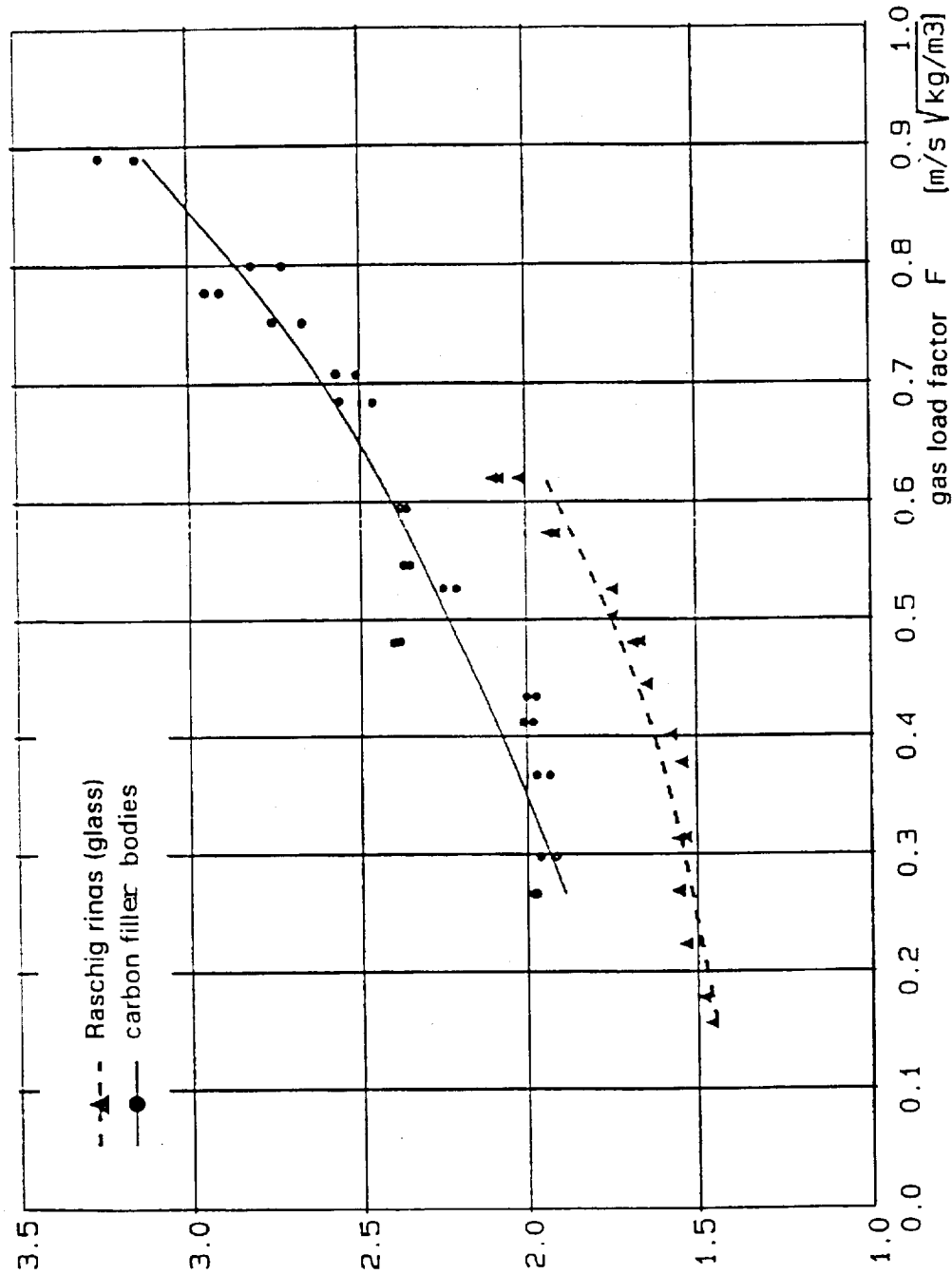
FIG. 3 ("Graph 2") is similar to FIG. 2 except that the performance is plotted in terms of the theoretical number of plates versus the steam load factor.

The usability of filler bodies manufactured according to the embodiment was tested in a distillation column with a column diameter of 200 mm and a filler body packing height of 1900 mm and the data quoted above for the surface of the packing and the free volume of the packing, using the cyclohexane/n-heptane system and in comparison with glass Raschig rings of 20 mm diameter and a height of 20 mm. The results are shown in graphs 1 and 2 (FIGS. 2 and 3). From graph 1 it can be seen that the specific pressure loss dp per unit of column height in meters corresponds to that of the Raschig rings. Graph 2 plots the theoretical number of plates against the steam load factor. In this case the carbon filler bodies clearly show a better separating effect than the Raschig rings acting as a comparison. The test results shown here prove the technical usability of filler bodies according to the invention.

What is claimed is:

1. A process for manufacturing an essentially carbon filler body or distributing body for a flowing fluid, which process comprises:
   a. grinding cereal to obtain a ground product;
   b. mixing at least a fractional part of the ground product with a binder to obtain a plastic composition;
   c. shaping the resulting plastic composition into a shaped primary body having the shape of the essentially carbon filler body or distributing body but not the same dimensions;
   d. hardening the said shaped primary body;
   e. coking the resulting hardened body at an elevated temperature in the absence of media having an oxidizing effect thereby obtaining said filler body or distributing body consisting essentially of carbon.

2. The process as claimed in claim 1, wherein the cereal is wheat, rye, barley, maize, rice, oats, millet, spelt, or buckwheat.

3. The process as claimed in claim 1, wherein the cereal is wheat.

4. The process as claimed in claim 1, wherein the binder is water.

5. The process as claimed in claim 4, wherein a filler is optionally added in said mixing step, and wherein the amount of water is from 10 to 55 percent by weight of the amount of the dry material including said at least a fractional part of the ground product and any filler which is optionally added.

6. The process as claimed in claim 4, wherein said hardening step is carried out by drying the said shaped primary body such that the resulting hardened body is of stable form and suitable for coking.

7. The process as claimed in claim 6, wherein said shaped primary body is dried to a residual water content of 5 to 20 percent by weight.

8. The process as claimed in claim 1, wherein said at least fractional part of the ground product is a fraction of the ground product which contains starch.

9. The process as claimed in claim 1, wherein said at least a fractional part of the ground product is a fraction of the ground product which contains hard wheat semolina or soft wheat semolina.

10. The process as claimed in claim 1, wherein the binder contains a hardenable resin.

11. The process as claimed in claim 10, wherein the hardenable resin is a phenolformaldehyde or furan resin.

12. The process as claimed in claim 1, wherein said shaping step is carried out by extruding said plastic composition to obtain an extruded strand and dividing the extruded strand into pieces of specified length.

13. The process as claimed in claim 1, wherein said shaping step is carried out by molding said plastic composition with the aid of molding rolls.

14. The process as claimed in claim 1, wherein said elevated temperature of said coking step is at least 600° C.

15. The process as claimed in claim 14, wherein said elevated temperature is at least 1000° C. but not more than 3000° C.

16. The process as claimed in claim 1, wherein an effective amount of a filler whose ash content does not exceed 15% by weight of the filler after being subjected to said coking step is included in said plastic composition.

17. The process as claimed in claim 16, wherein said effective amount does not exceed 60% by weight of said at least a fractional part of the ground product before the mixing with the binder.

18. The process as claimed in claim 1, wherein a processing auxiliary is included in said plastic composition, said processing auxiliary being a molding or flow auxiliary, a wetting aid, an emulsifier, or a stabilizer.

19. The process as claimed in claim 1, wherein said binder is such that after said hardening step it can no longer be softened, and said binder does not produce liquid cokable substances during said coking step.

* * * * *